(12) United States Patent
Ghosh et al.

(10) Patent No.: US 9,967,098 B2
(45) Date of Patent: May 8, 2018

(54) ELLIPTIC CURVE HARDWARE INTEGRATED CIRCUIT

(71) Applicant: Intel Corporation, Santa Clara, CA (US)

(72) Inventors: Santosh Ghosh, Hillsboro, OR (US); Manoj R Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 14/757,658

(22) Filed: Dec. 23, 2015

(65) Prior Publication Data

US 2017/0187530 A1    Jun. 29, 2017

(51) Int. Cl.
*H04L 29/00* (2006.01)
*H04L 9/30* (2006.01)
*H04L 9/14* (2006.01)

(52) U.S. Cl.
CPC .............. *H04L 9/3066* (2013.01); *H04L 9/14* (2013.01); *H04L 2209/24* (2013.01)

(58) Field of Classification Search
CPC ................................ H04L 9/3066; H04L 9/14
USPC ......................................................... 380/28
See application file for complete search history.

(56) References Cited

U.S. PATENT DOCUMENTS 5,982,895 A * 11/1999 Dworkin ................. G06F 7/726
                                                              380/271

OTHER PUBLICATIONS

Ray Cheung, Nicolas Telle, Wayne Luk, Peter Cheung/ Customizable Elliptic Curve Cryptosystems/ Oct. 2005/ IEEE/ pp. 1048-1059.*

* cited by examiner

*Primary Examiner* — Brandon Hoffman
*Assistant Examiner* — Michael D Anderson
(74) *Attorney, Agent, or Firm* — Schwegman Lundberg & Woessner, P.A.

(57) ABSTRACT

Embodiments of a system for, and method for using, an elliptic curve cryptography integrated circuit are generally described herein. An elliptic curve cryptography (ECC) operation request may be received. One of a plurality of circuit portions may be instructed to perform the ECC operation. The plurality of circuit portions that may be used include a finite field arithmetic circuit portion, an EC point addition and doubler circuit portion, a finite field exponentiation circuit portion, and a point multiplier circuit portion. The result of the ECC operation may then be output.

23 Claims, 7 Drawing Sheets

ELLIPTIC CURVE HARDWARE INTEGRATED CIRCUIT

BACKGROUND

Asymmetric Key or Public Key Cryptography (PKC) enables end-to-end secure communication. Elliptic Curve Cryptography (ECC) is one of the most efficient mathematical tools for developing PKC algorithms and protocols with respect to both public and private key generation. ECC is a basic cryptographic technique for internet of things (IoT) devices to enable privacy identification or elliptic curve Diffie-Hellman protocols for secure communications as well as verification of signed images during secure boot.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
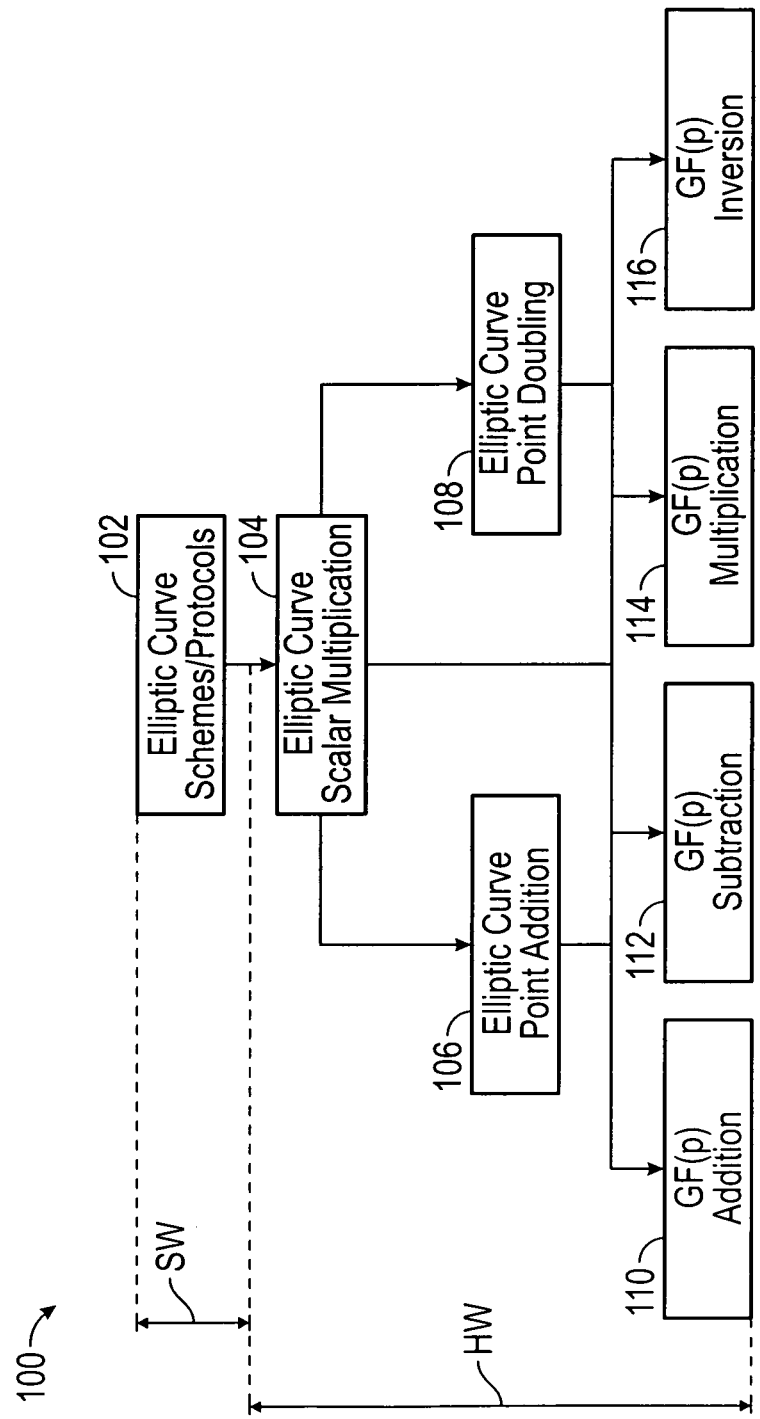
FIG. 1 illustrates a block diagram of an elliptic curve hierarchy in accordance with some embodiments.

As noted above, ECC techniques are useful for IoT implementations. In fact, IoT devices may rely on ECC for secure communications with networked devices. As these devices have become more and more prevalent in the world, security has become more and more important. Currently, most ECC operations are done using generic processors and software. IoT devices often include unique constraints on physical space, latency, and power output. However, these ECC operations on generic hardware may be power and compute intensive. The new ECC hardware engine described herein includes specific hardware circuitry components for performing ECC operations. Further, the ECC hardware engine described herein meets the tight resource (e.g., area, latency, and power) constraints of IoT devices. The ECC hardware engine includes further features to mitigate hardware-based Side-Channel Attacks (e.g., timing, power, and electromagnetic (EM) attacks).

In an example, the ECC hardware engine described below includes an area and energy saving design to determine where to divide the ECC operations between hardware and software. Hardware layers may conduct prime field arithmetic and elliptic curve operations. Software layers may perform a Sign/Verify ECC protocol, a Diffie-Hellman ECC protocol, or privacy identification, such as Enhanced Privacy ID (EPID) operations.

The ECC hardware engine described below may include protection against side-channel attacks, such as Timing, Simple Power Attack (SPA), Simple EM Attack (SEMA), Differential Power Attack (DPA), and Differential EM Attack (DEMA). For example, the DPA and DEMA may be performed by probing inputs to the ECC hardware engine. To address this attack, the inputs may be randomized so that there is no correlation between the inputs and the power consumed. For example, inputs may be transformed from one coordinate system (e.g., Affine) to another coordinate system (e.g., Randomized Jacobian).

The Timing, SPA and SEMA may be performed by observing time, power consumption, and electromagnetic radiation, and correlating these to exponent bits. The exponent bits include the values that are kept secret in an ECC protocol, which the attacker is trying to obtain. To address these attacks, a computation that has the same time, power, and EM signatures for processing either 0 or 1 secret bit may be used with the ECC hardware engine. In an example, the signatures may be made the same for processing a 0 or 1 secret but using a Montgomery Ladder.

In another example, the ECC hardware engine described below may not be configured to protect from side-channel attacks. In this example, the ECC hardware engine may run faster than configurations with protection from side-channel attacks. For example, an elliptic curve digital signature algorithm (ECDSA) verification may be done on an ECC hardware engine without protection from side-channel attacks for speed. No private key is used for ECDSA verification, so there may be no concern over side-channel attacks. Running the ECDSA verification on ECC hardware engine configured to not include protection from side-channel attacks may be faster and just as secure.

FIG. 1 illustrates a block diagram of an elliptic curve hierarchy 100 in accordance with some embodiments. In an example, the elliptic curve hierarchy 100 includes software aspects and hardware aspects for determining cryptographic keys using an elliptic curve. For example, elliptic curve schemes/protocols 102, or other high level techniques may be done in software. Other elliptic curve operations may be done in hardware, such as elliptic curve scalar multiplication 104, elliptic curve point addition 106, elliptic curve point doubling 108, and finite field arithmetic, such as GF(p) addition 110 GF(p) subtraction 112, GF(p) multiplication 114, and GF(p) inversion 116. The elliptic curve operations that may be done in hardware may be done on shared hardware circuitry portions. For example, the elliptic curve point addition 106 and the elliptic curve point doubling 108 may be done on the same hardware circuitry. In another example, the finite field arithmetic operations 110-116 may be done on the same hardware circuitry. In another example, the hardware/software division may be in a different circuit portion (e.g., different place on the die), such as doing the elliptic curve scalar multiplication 104 in software, or doing the elliptic curve schemes/protocols 102 in hardware, or partially in hardware.

In an example, micro-architecture for an ECC hardware engine may be based on 256-bit prime field elliptic curves including elliptic curves used in examples such as, National Institute of Standards and Technology (NIST) p. 256, Chinese curve SM2, the elliptic curve used in EPID, other governmental or standards based ECC recommendations, etc.

The ECC hardware engine may include an optimized computation technique. In an example, design of underlying mathematical operations are optimized for area and power. For example, GF(p) (GF stands for Galois field or finite field) multiplication in general may be computed by integer multiplication followed by a reduction technique. In the hardware, this operation may be done by interleaving multiplication and reduction at each step of the multiplication rather than reducing the 2n-bit multiplication result to an n-bit number in a reduction step at the end. This technique as implemented in dedicated hardware circuitry and results in lower area and latency for the hardware circuitry. The micro-architecture for each of the sub-functions may be designed to meet area-time-power budgets. For example, a GF(p) multiplication datapath may be designed with two parallel 128-bit carry-chains instead of one 256 bit long carry-chain. In this example processing the two parallel 128-bit carry-chains may result in decreased latency compared to processing a 256-bit carry-chain.

In an example, the ECC hardware engine may include logic sharing among underlying operations. For example, a combined datapath for computing GF(p) Multiplication, Addition and Subtraction may be implemented in the hardware circuitry. In an example, 60% of logic of a GF(p) arithmetic circuit portion may be shared among these three operations. The GF(p) arithmetic circuit portion may include other logic for each of finite field multiplication, finite field addition, and finite field subtraction. In another example, a shared datapath for Point Addition and Point Doubling may be implemented in the hardware circuitry.

The elliptic hardware engine may be configured to compute any underlying operations used for public key ECC generation, such as a Sign/Verify protocol, a Diffie-Hellman protocol, or the like. The elliptic hardware engine may resistant to exposing secrets when subjected to timing, power, or EM based side-channel attacks. In an example, the design of an ECC engine may be modular and parameterized. For example, keys for 128-bit security (using ECC 256) or 256-bit security (using ECC 512) may be implemented using the same ECC hardware engine by changing a parameter.

Figure 2:
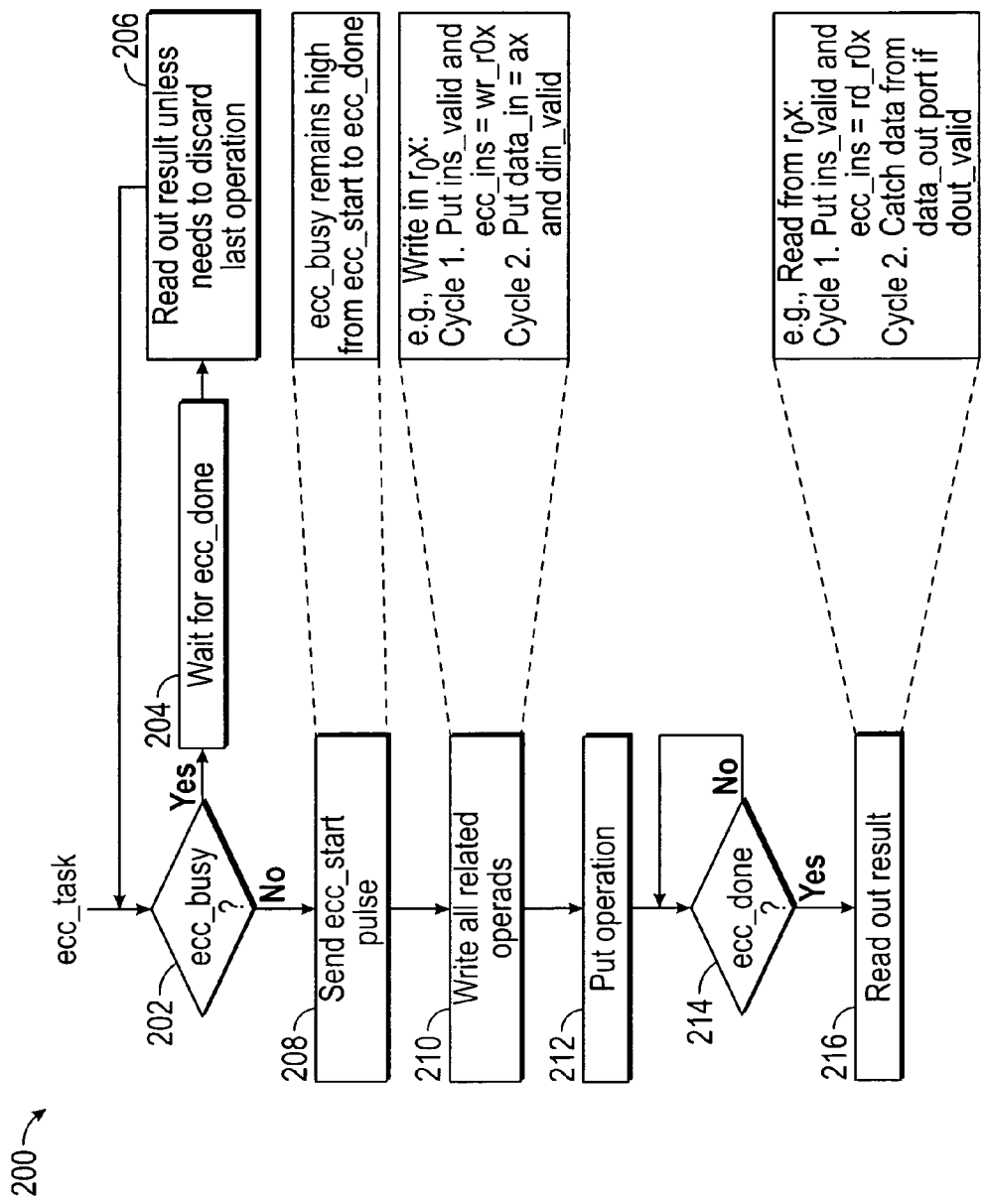
FIG. 2 illustrates a flowchart showing a technique for performing an elliptic curve cryptography operation in hardware in accordance with some embodiments.

FIG. 2 illustrates a flowchart showing a technique 200 for performing an elliptic curve cryptography operation in hardware in accordance with some embodiments. The technique 200 shows how an ECC hardware engine may be configured to produce ECC operation results. In an example, software running on a machine coupled to the ECC hardware engine may offload an operation to ECC hardware engine. For example, the operations may include, elliptic curve point multiplication (d[A]), elliptic curve point addition (A+B), elliptic curve point doubling (2A), GF(p) exponentiation (a^b mod p), GF(p) multiplication (ab mod p), GF(p) addition (a+b mod p), or GF(p) subtraction (a-b mod p).

The technique 200 may start with an ECC operation, such as an ECC operation assigned by a machine coupled to the ECC hardware engine. In an example, the technique 200 may be controlled or run by execution control circuitry of an ECC hardware engine, including an integrated circuit. The technique 200 may include determining whether the ECC is busy by using an ecc_busy pin at decision 202. When the ecc_busy pin indicates the ECC hardware engine is busy, the technique 200 may include waiting for an ecc_done pin to indicate (at block 204) that the ECC hardware engine is finished with a previous operation. In response to ecc_done indicating that the ECC hardware engine is finished with an operation, the results may be read out at block 206. When the ecc_busy pin indicates the ECC hardware engine is not busy, a pulse may be sent to an ecc_start pin at block 208. In an example, the ecc_busy pin may remain high starting when the pulse is sent to ecc_start, and ending when ecc_done indicates the operation is complete. In response to the ecc_start pulse at block 208, the technique may include writing related operands appropriate to an indicated ECC operation at block 210. For example, data may be written to a register (e.g., register $r_0x$). Block 212 may include a put operation and proceed to determine whether ecc_done indicates that the operation is complete at decision block 214. When ecc_done indicates the operation is complete, the result may be read out at block 216. For example, the data written in the register at block 210 may be read out to an output pin. In an example, the output pin sends the data to a machine coupled to the ECC hardware engine for further use in creating ECC keys. In another example, other pins or resource allocation schemes may be used in an ECC hardware engine.

Figure 3:
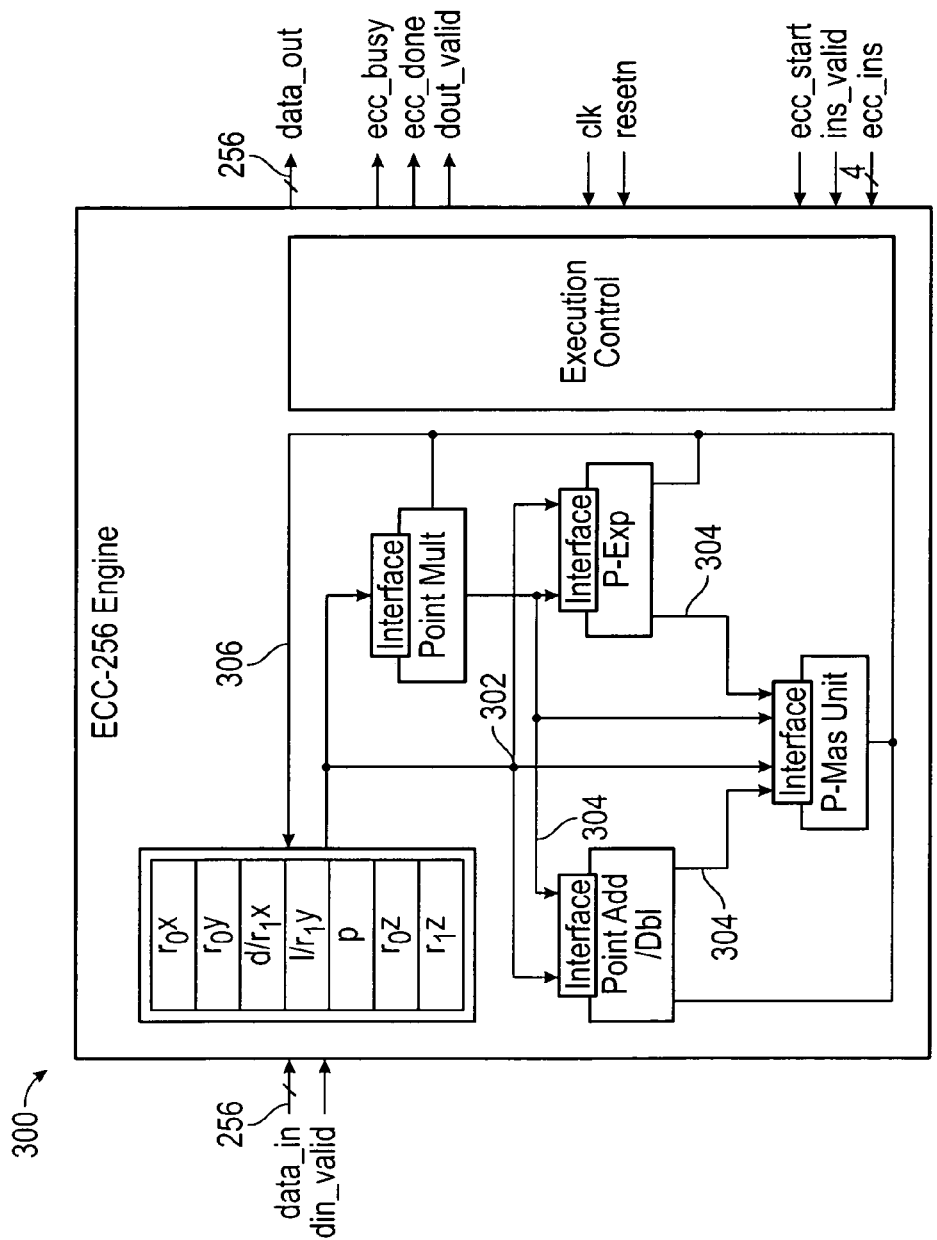
FIG. 3 illustrates an elliptic curve cryptography integrated circuit in accordance with some embodiments.

FIG. 3 illustrates an example of an integrated circuit 300 for elliptic curve cryptography in accordance with some embodiments. In an example, the integrated circuit 300 may include micro-architecture as shown in FIG. 3. The integrated circuit 300 may compute elliptic curve point operations in Jacobian Projective Coordinates. For example, the integrated circuit 300 may use a Montgomery powering ladder to protect the secret scalar against timing and other side-channel attacks. In order to protect the secret scalar against differential side-channel attacks, the integrated circuit 300 may provide circuitry to execute a randomized projective coordinate technique. The integrated circuit 300 may include interface pins through which the integrated circuit 300 may communicate with other machines, such as a machine executing a program to determine a cryptographic key using ECC.

In an example, top level architecture and interfaces of the integrated circuit 300 include status pins, control pins, and data in/out ports. The status pins in the integrated circuit 300 may include an ecc_busy pin, which when high indicates the integrated circuit 300 is busy, (e.g., 1=ECC engine is busy). In an example, a status pin includes an ecc_done pin to indicate the integrated circuit 300 has completed its current execution. In another example, the integrated circuit 300 includes a dout_valid pin to indicate that data at a data_out port is valid.

A control pin may include a clk_pin to be used as a system clock and a resetn pin to be used as an asynchronous system reset. Another control pin may include an ecc_start pin. In an example, a pulse to the ecc_start pin may activate the integrated circuit 300. In an example, the ecc_start pin may be used to start each new operation. In another example, an ins_valid pin may be used as a control pin, and when high, may indicate an instruction is valid (e.g., when ins_valid=1, an instruction in a 4-bit ecc_ins port is valid). An ecc_ins pin may include a 4-bit instruction input port. Table 1 lists several example opcodes and functionalities. The integrated circuit 300 may include a control pin din_valid to indicate, when high, that data in the data_in port is valid.

TABLE 1

The opcode values in ecc_ins and respective operations.

| ecc_ins | Operation | Functionalities |
|---|---|---|
| 0001 | write $r_0x$ | Represents: i) The x-coordinate of point A for [d]A, A + B, and 2A.<br>ii) First operand, a for GF(p) operations. |
| 0010 | write $r_0y$ | Represents: i) The y-coordinate of point A for [d]A, A + B, and 2A.<br>ii) Second operand, b for GF(p) operations. |
| 0011 | write $r_1x$/d | Represents: i) Scalar d for [d]A, Here d is a 256-bit number.<br>ii) The x-coordinate of point B for A + B |
| 0100 | write $r_1y$/l | Represents: i) Lambda (λ) for [d]A. Note that λ > 0, λ = 1 means no<br>differential side-channel resistance, and random λ ∈ GF(p)<br>enables security against DPA/DEMA.<br>ii) The y-coordinate of point B for A + B |
| 0101 | write p | Represents: prime modulus p. |
| 0110 | read $r_0x$ | Represents: i) The x-coordinate of resultant point [d]A, A + B, and 2A.<br>ii) Result of all GF(p) operations.<br>Note: Effective after ecc_done until next ecc_start. |
| 0111 | read $r_0y$ | Represents: i) The y-coordinate of resultant point [d]A, A + B, and 2A.<br>Note: Effective after ecc_done until next ecc_start. |
| 1000 | d[A] | Represents: i) Elliptic curve scalar multiplication operation |
| 1001 | A + B | Represents: i) Elliptic curve point addition operation |
| 1010 | 2A | Represents: i) Elliptic curve point doubling operation |
| 1011 | $a^b$ (mod p) | Represents: i) GF(p) exponentiation operation. Note: $a^{-1} = a^{p-2}$ (mod p). |
| 1100 | a * b (mod p) | Represents: i) GF(p) multiplication operation |
| 1101 | a + b (mod p) | Represents: i) GF(p) addition operation |
| 1110 | a − b (mod p) | Represents: i) GF(p) subtraction operation |
| 1111 | Reserved | |

Data in/out ports may include a data_in port, such as a 256-bit data input port. Data received via the data_in port may be recognized as valid when the din_valid pulse is high. In an example, a data_in/out port may include a data_out port, such as a 256-bit data output port. A dout_valid pulse may indicate the data output through the data_out port is valid output data.

In FIG. 3, line 302 represents data flow from registers to respective circuit portions. These lines may indicate that functionalities of those circuit portions are directly accessible from the outside. Line 304 indicates the access of circuit portions for internal use. For example, the point_mult circuit portions may access the other three circuit portions: point add/dbl, p-exp, and p-mas circuit portions. Similarly, p-exp circuit portions may access p-mas circuit portions, etc. Line 306 indicates the flow of a result from a circuit portions to the top level registers. For example, if the integrated circuit 300 is programmed for a point multiplication then the point_mull circuit portions may write back the result to the top level registers. Similarly, if the integrated circuit 300 is programmed for a GF(p) mult/add/sub operation, then the p-mas circuit portions may write back the result into the $r_0x$ register.

The integrated circuit 300 includes advantageous aspects including a low area, low latency, and low energy. For example, the integrated circuit 300 is lightweight in terms of die-area. In an example, the integrated circuit 300 may include an area of approximately 42K gates. The integrated circuit 300 has low latency. For example, the integrated circuit 300 may use 256 clock cycles to compute a GF(p) multiplication, which is more than ten times faster than using a general processor. The integrated circuit 300 uses low energy. For example, the circuit design shown in FIG. 3 may yield lower energy due to optimized register counts, minimized register updates, or reduced area or latency.

In an example, the value $1/(r_1·y)$ may be used as a hardware configuration parameter. The value "l" may be used to vary the side channel attack protection configuration of the integrated circuit 300. For example, when l=0, no side channel attack protection may be implemented on the integrated circuit 300. When l=1, simple side channel attack protection may be implemented on the integrated circuit 300. When l=a random number, differential and simple side channel attack protection may be implemented on the integrated circuit 300. Other techniques to control and vary the side channel attack protection configuration of the integrated circuit 300 may be used.

Figure 4:
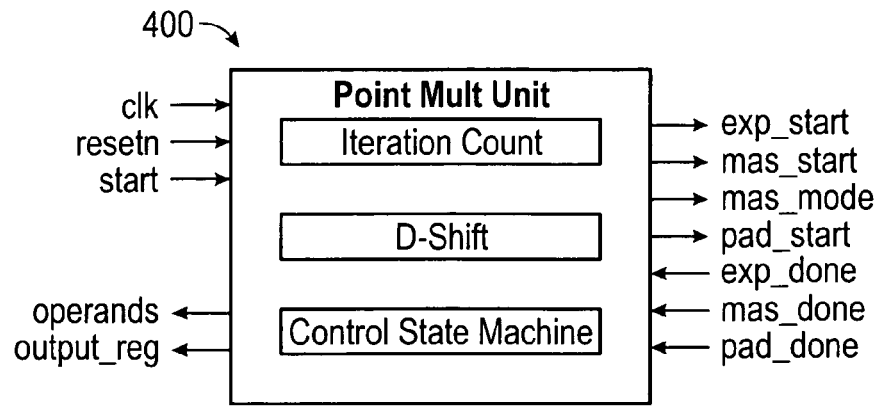
FIG. 4 illustrates a point multiplier circuit portion of an integrated circuit in accordance with some embodiments.

FIG. 4 illustrates a point multiplier circuit portion 400 of an integrated circuit in accordance with some embodiments. In an example, the point multiplier circuit portion includes iteration count circuitry and d-shift circuitry. D-shift circuitry may include a 1-bit left shift register that is initialized by a scalar integer, d. The point multiplier circuit portion may include a plurality of pins to receive and send data. The point multiplier circuit portion may send and receive data to and from the integrated circuit to implement or perform finite field exponential operations, including using a finite field arithmetic engine.

Figure 5:
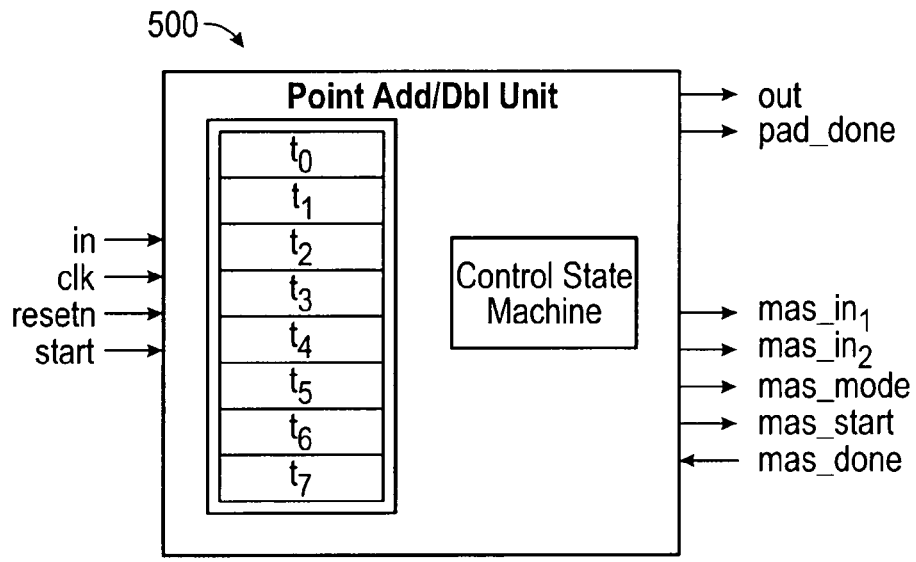
FIG. 5 illustrates an elliptic curve point addition and doubler circuit portion of an integrated circuit in accordance with some embodiments.

FIG. 5 illustrates an elliptic curve point addition and doubler circuit portion 500 of an integrated circuit in accordance with some embodiments. The elliptic curve point addition and doubler circuit portion 500 may include an 8-bit register to store addition or doubling data. In an example, the elliptic curve point addition and doubler circuit portion 500 may send and receive data to and from the integrated circuit to implement elliptic curve addition or doubling, including using a finite field arithmetic engine.

Figure 6:
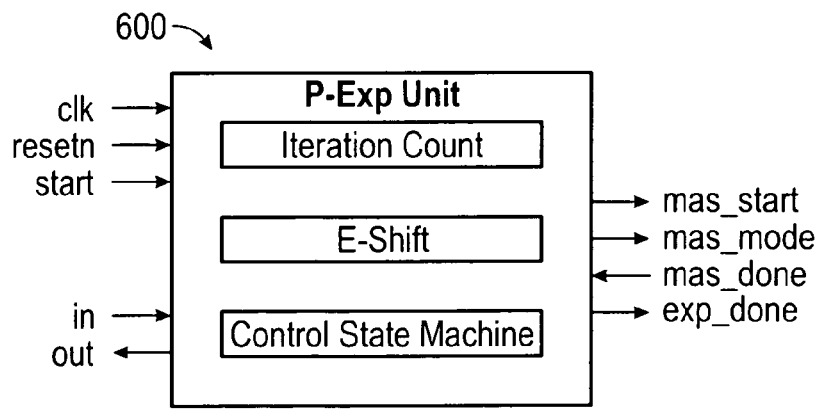
FIG. 6 illustrates a finite field exponentiation circuit portion of an integrated circuit in accordance with some embodiments.

FIG. 6 illustrates a finite field exponentiation circuit portion 600 of an integrated circuit in accordance with some embodiments. The finite field exponentiation circuit portion 600 may be resistant to side-channel attacks. For example, the finite field exponentiation circuit portion 600 may use a Montgomery Ladder to be resistant to side-channel attacks. In another example, the finite field exponentiation circuit portion 600 may convert an input from a first coordinate system to a second coordinate system to be resistant to side-channel attacks. The first coordinate system may include an Affine coordinate system and the second coordinate system may include a Randomized Jacobian coordinate system. In another example, the finite field exponentiation circuit portion 600 may include iteration count circuitry and e-shift circuitry. The e-shift circuitry may include a 1-bit left shift register that is initialized by an exponent, e. In an example, the finite field exponentiation circuit portion 600 may send and receive data to and from the integrated circuit to implement finite field exponent operations, including using a finite field arithmetic engine.

Figure 7:
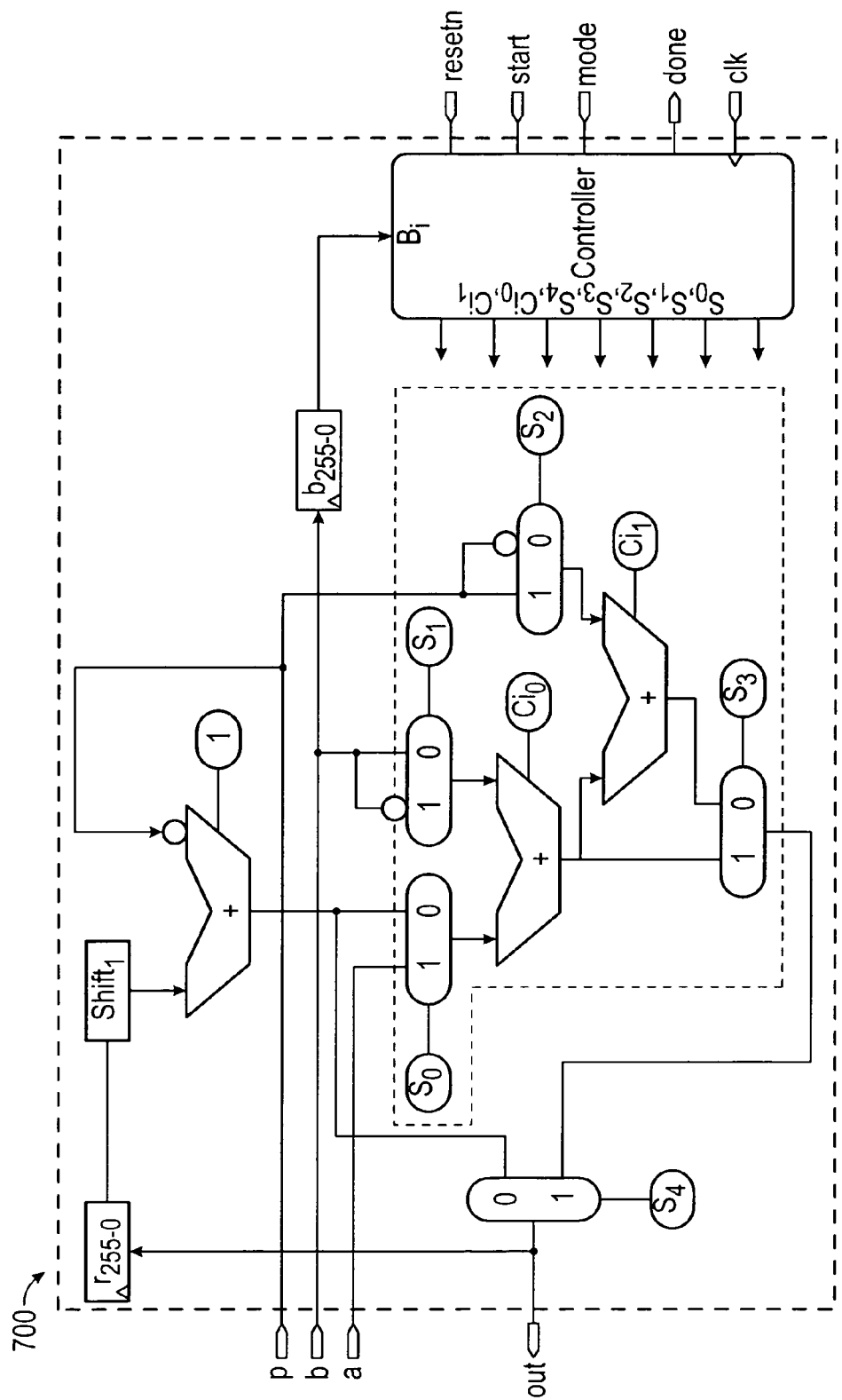
FIG. 7 illustrates a finite field arithmetic circuit portion of an integrated circuit in accordance with some embodiments.

FIG. 7 illustrates a finite field arithmetic circuit portion 700 of an integrated circuit in accordance with some embodiments. In an example, the finite filed arithmetic circuit portion 700 may be operably coupled to the finite field exponentiation circuit portion 600 of FIG. 6. In another example, the finite filed arithmetic circuit portion 700 may be operably coupled to the elliptic point addition and doubler circuit portion 500 of FIG. 5. The finite field arithmetic circuit portion 700 may send and receive data from the integrated circuit to implement finite field arithmetic. The finite field arithmetic circuit portion 700 may perform an operation comprising finite field multiplication, finite field addition, or finite field subtraction. In an example, the finite field arithmetic circuit portion 700 is to perform the ECC operation using two parallel 128-bit carry-chains.

Figure 8:
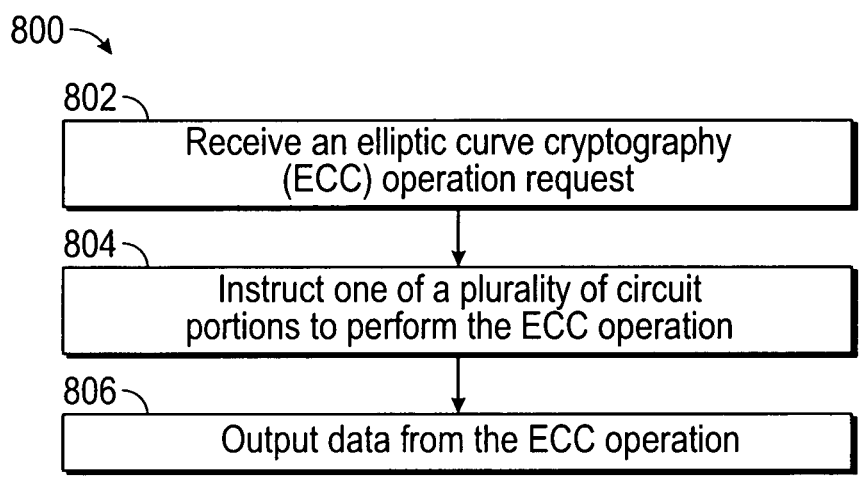
FIG. 8 illustrates a flowchart showing a technique for using an integrated circuit to compute elliptic curve (EC) cryptography (ECC) operations in accordance with some embodiments.

FIG. 8 illustrates a flowchart showing a technique 800 for using an integrated circuit to compute elliptic curve (EC) cryptography (ECC) operations in accordance with some embodiments. The technique 800 includes an operation 802 to receive an ECC operation request. The technique 800 includes an operation 804 to instruct one of a plurality of circuit portions to perform the ECC operation. In an example, the plurality of circuit portions may include a finite field arithmetic circuit portion, an EC point addition and doubler circuit portion, a finite field exponentiation circuit portion, or a point multiplier circuit portion. The point multiplier circuit portion may be operably coupled to the finite field arithmetic circuit portion, the EC point addition and doubler circuit portion, or the finite field exponentiation circuit portion. In an example, the ECC operation includes an operation comprising finite field multiplication, finite field addition, or finite field subtraction to be performed by the finite field arithmetic circuit portion.

The EC point addition and doubler circuit portion may be operably coupled to the finite field arithmetic circuit portion or the finite field exponentiation circuit portion may be operably coupled to the finite field arithmetic circuit portion. The finite field exponentiation circuit portion may include iteration count circuitry and e-shift circuitry. The elliptic curve point addition and double circuit portion may include an 8-bit register. The point multiplier circuit portion may include iteration count circuitry and d-shift circuitry. The finite field arithmetic circuit portion may perform the ECC operation using two parallel 128-bit carry-chains.

The technique 800 includes an operation 806 to output data from the ECC operation. In an example, outputting data from the ECC operation includes writing data from the ECC operation to a top level register. In another example, the technique 800 may include outputting data from a plurality of ECC operations to generate keys for a SignNerify protocol or a Diffie-Hellman protocol. The technique 800 may include executing the SignNerify protocol or the Diffie-Hellman protocol. The generated keys may include keys for 128-bit or 256-bit security.

The finite field exponentiation circuit portion may be resistant to side-channel attacks. For example, the finite field exponentiation circuit may use a Montgomery Ladder to be resistant to side-channel attacks, or may convert an input from a first coordinate system to a second coordinate system to be resistant to side-channel attacks. In an example, the first coordinate system is Affine and the second coordinate system is Randomized Jacobian.

Figure 9:
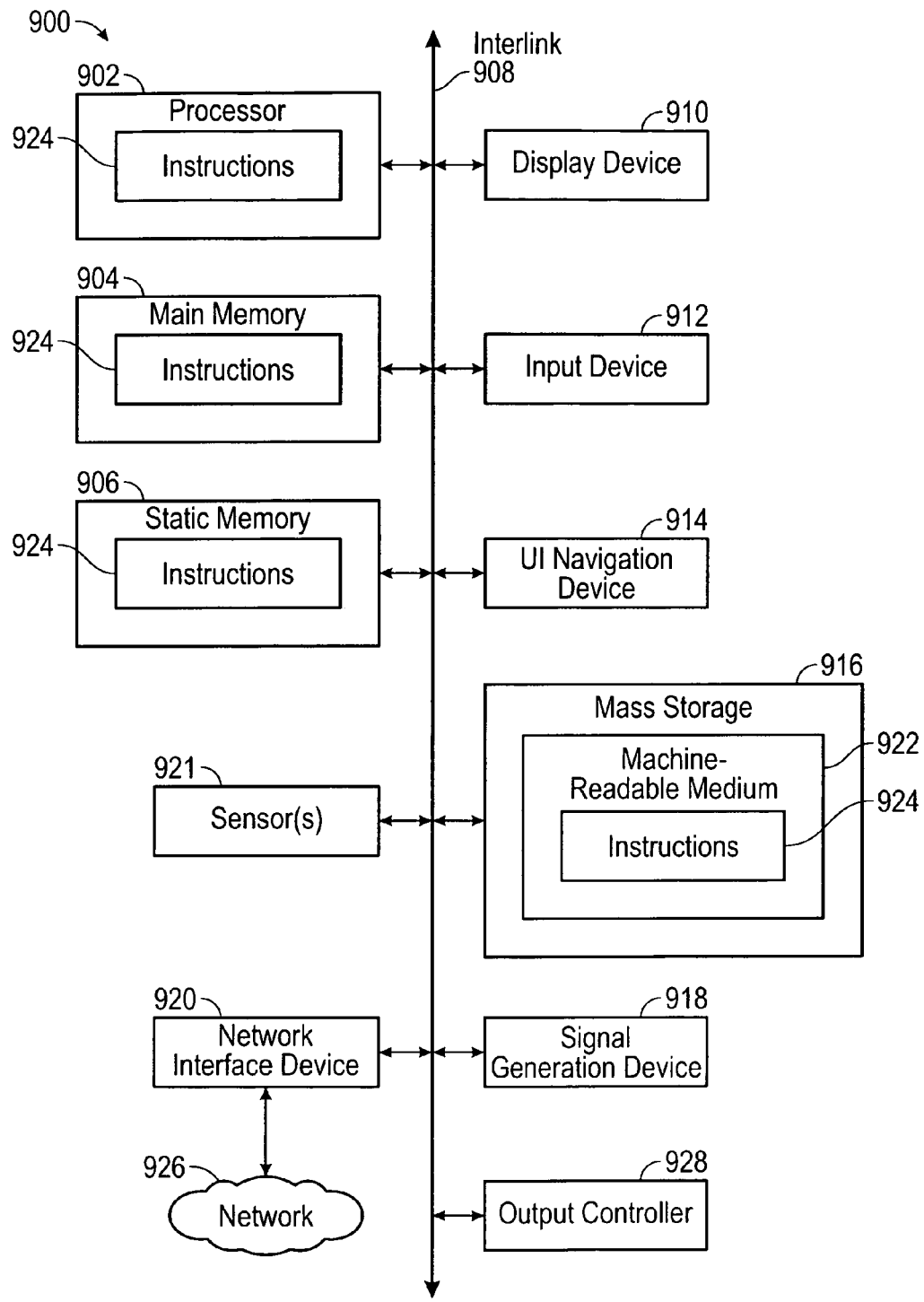
FIG. 9 illustrates generally an example of a block diagram of a machine upon which any one or more of the techniques (e.g., methodologies) discussed herein may perform in accordance with some embodiments.

FIG. 9 illustrates generally an example of a block diagram of a machine 900 upon which any one or more of the techniques (e.g., methodologies) discussed herein may perform in accordance with some embodiments. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing-instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908.

The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 is an integrated circuit for elliptic curve (EC) cryptography (ECC) operations, the integrated circuit comprising: a plurality of circuit portions including: a finite field arithmetic circuit portion to compute finite field arithmetic operations; an elliptic curve (EC) point addition and doubler circuit portion to perform EC addition and doubling; a finite field exponentiation circuit portion to perform finite field exponential operations; a point multiplier circuit portion to perform point multiplication, the point multiplier circuit portion operably coupled to the finite field arithmetic circuit portion, the EC point addition and doubler circuit portion, and the finite field exponentiation circuit portion; and execution control circuitry to: receive an elliptic curve cryptography (ECC) operation request; instruct one of the plurality of circuit portions to perform the ECC operation; and output data from the ECC operation.

In Example 2, the subject matter of Example 1 optionally includes, wherein the EC point addition and doubler circuit portion is operably coupled to the finite field arithmetic circuit portion.

In Example 3, the subject matter of any one or more of Examples 1-2 optionally include, wherein the finite field exponentiation circuit portion is operably coupled to the finite field arithmetic circuit portion.

In Example 4, the subject matter of any one or more of Examples 1-3 optionally include, wherein the execution control circuitry is to write the output data from the ECC operation to a top level register.

In Example 5, the subject matter of any one or more of Examples 1-4 optionally include, wherein the finite field exponentiation circuit portion includes iteration count circuitry and e-shift circuitry.

In Example 6, the subject matter of any one or more of Examples 1-5 optionally include, wherein the finite field arithmetic circuit portion is to perform an operation comprising at least one of finite field multiplication, finite field addition, or finite field subtraction.

In Example 7, the subject matter of any one or more of Examples 1-6 optionally include, wherein the finite field arithmetic circuit portion is to perform the ECC operation using two parallel 128-bit carry-chains.

In Example 8, the subject matter of any one or more of Examples 1-7 optionally include, wherein the elliptic curve point addition and double circuit portion includes eight security-length-bit registers.

In Example 9, the subject matter of any one or more of Examples 1-8 optionally include, wherein the point multiplier circuit portion includes iteration count circuitry and d-shift circuitry.

In Example 10, the subject matter of any one or more of Examples 1-9 optionally include, wherein the execution control circuitry is to output data from a plurality of ECC operations to generate keys for at least one of a Sign/Verify protocol or a Diffie-Hellman protocol.

In Example 11, the subject matter of Example 10 optionally includes, wherein the execution control circuitry is coupled to a machine including a general purpose processor and memory, the memory including instructions, which when executed by the general purpose processor, cause the machine to execute the Sign/Verify protocol or the Diffie-Hellman protocol.

In Example 12, the subject matter of any one or more of Examples 10-11 optionally include, wherein the generated keys include keys for 128-bit or 256-bit security.

In Example 13, the subject matter of any one or more of Examples 1-12 optionally include, wherein the point multiplier circuit portion is resistant to side-channel attacks.

In Example 14, the subject matter of Example 13 optionally includes, wherein the point multiplier circuit portion uses a Montgomery Ladder to be resistant to side-channel attacks.

In Example 15, the subject matter of any one or more of Examples 13-14 optionally include, wherein the point multiplier circuit portion converts an input from a first coordinate system to a second coordinate system to be resistant to side-channel attacks.

In Example 16, the subject matter of Example 15 optionally includes, wherein the first coordinate system is Affine and the second coordinate system is Randomized Jacobian.

In Example 17, the subject matter of any one or more of Examples 13-16 optionally include, wherein the point multiplier circuit portion is resistant to at least one of simple side-channel attacks or differential side-channel attacks.

In Example 18, the subject matter of any one or more of Examples 1-17 optionally include, wherein the point multiplier circuit portion is not resistant to side-channel attacks.

In Example 19, the subject matter of any one or more of Examples 1-18 optionally include, wherein the finite field exponentiation circuit portion is resistant to side-channel attacks.

In Example 20, the subject matter of Example 19 optionally includes, wherein the finite field exponentiation circuit portion uses a Montgomery Ladder to be resistant to side-channel attacks.

Example 21 is a method for using an integrated circuit to compute elliptic curve (EC) cryptography (ECC) operations, the method comprising: receiving an elliptic curve cryptography (ECC) operation request; instructing one of a plurality of circuit portions to perform the ECC operation, the plurality of circuit portions including a finite field arithmetic circuit portion, an elliptic curve (EC) point addition and doubler circuit portion, a finite field exponentiation circuit portion, and a point multiplier circuit portion, wherein the point multiplier circuit portion is operably coupled to the finite field arithmetic circuit portion, the EC point addition and doubler circuit portion, and the finite field exponentiation circuit portion; and outputting data from the ECC operation.

In Example 22, the subject matter of Example 21 optionally includes, wherein the EC point addition and doubler circuit portion is operably coupled to the finite field arithmetic circuit portion.

In Example 23, the subject matter of any one or more of Examples 21-22 optionally include, wherein the finite field exponentiation circuit portion is operably coupled to the finite field arithmetic circuit portion.

In Example 24, the subject matter of any one or more of Examples 21-23 optionally include, wherein outputting data from the ECC operation includes writing data from the ECC operation to a top level register.

In Example 25, the subject matter of any one or more of Examples 21-24 optionally include, wherein the finite field exponentiation circuit portion includes iteration count circuitry and e-shift circuitry.

In Example 26, the subject matter of any one or more of Examples 21-25 optionally include, wherein the ECC operation includes an operation comprising at least one of finite field multiplication, finite field addition, or finite field subtraction to be performed by the finite field arithmetic circuit portion.

In Example 27, the subject matter of any one or more of Examples 21-26 optionally include, wherein the finite field arithmetic circuit portion is to perform the ECC operation using two parallel 128-bit carry-chains.

In Example 28, the subject matter of any one or more of Examples 21-27 optionally include, wherein the elliptic curve point addition and double circuit portion includes eight security-length-bit registers.

In Example 29, the subject matter of any one or more of Examples 21-28 optionally include, wherein the point multiplier circuit portion includes iteration count circuitry and d-shift circuitry.

In Example 30, the subject matter of any one or more of Examples 21-29 optionally include, further comprising, outputting data from a plurality of ECC operations to generate keys for at least one of a Sign/Verify protocol or a Diffie-Hellman protocol.

In Example 31, the subject matter of Example 30 optionally includes, further comprising executing the Sign/Verify protocol or the Diffie-Hellman protocol.

In Example 32, the subject matter of any one or more of Examples 30-31 optionally include, wherein the generated keys include keys for 128-bit or 256-bit security.

In Example 33, the subject matter of any one or more of Examples 21-32 optionally include, wherein the point multiplier circuit portion is resistant to side-channel attacks.

In Example 34, the subject matter of Example 33 optionally includes, further comprising using a Montgomery Ladder to resist side-channel attacks on the point multiplier circuit portion.

In Example 35, the subject matter of any one or more of Examples 33-34 optionally include, further comprising converting an input from a first coordinate system to a second coordinate system to resist side-channel attacks.

In Example 36, the subject matter of Example 35 optionally includes, wherein the first coordinate system is Affine and the second coordinate system is Randomized Jacobian.

In Example 37, the subject matter of any one or more of Examples 33-36 optionally include, wherein the point multiplier circuit portion is resistant to at least one of simple side-channel attacks or differential side-channel attacks.

In Example 38, the subject matter of any one or more of Examples 21-37 optionally include, wherein the point multiplier circuit portion is not resistant to side-channel attacks.

In Example 39, the subject matter of any one or more of Examples 21-38 optionally include, wherein the finite field exponentiation circuit portion is resistant to side-channel attacks.

In Example 40, the subject matter of Example 39 optionally includes, further comprising using a Montgomery Ladder to resist side-channel attacks on the finite field exponentiation circuit portion.

Example 41 is at least one machine-readable medium including instructions for operation of a computing system, which when executed by a machine, cause the machine to perform operations of any of the methods of Examples 21-40.

Example 42 is an apparatus comprising means for performing any of the methods of Examples 21-40.

Example 43 is an apparatus for using an integrated circuit to compute elliptic curve (EC) cryptography (ECC) operations, the apparatus comprising: means for receiving an elliptic curve cryptography (ECC) operation request; means for instructing one of a plurality of circuit portions to perform the ECC operation, the plurality of circuit portions including a finite field arithmetic circuit portion, an elliptic curve (EC) point addition and doubler circuit portion, a finite field exponentiation circuit portion, and a point multiplier circuit portion, wherein the point multiplier circuit portion is operably coupled to the finite field arithmetic circuit portion, the EC point addition and doubler circuit portion, and the finite field exponentiation circuit portion; and means for outputting data from the ECC operation.

In Example 44, the subject matter of Example 43 optionally includes, wherein the EC point addition and doubler circuit portion is operably coupled to the finite field arithmetic circuit portion.

In Example 45, the subject matter of any one or more of Examples 43-44 optionally include, wherein the finite field exponentiation circuit portion is operably coupled to the finite field arithmetic circuit portion.

In Example 46, the subject matter of any one or more of Examples 43-45 optionally include, wherein the means for outputting data from the ECC operation include means for writing data from the ECC operation to a top level register.

In Example 47, the subject matter of any one or more of Examples 43-46 optionally include, wherein the finite field exponentiation circuit portion includes iteration count circuitry and e-shift circuitry.

In Example 48, the subject matter of any one or more of Examples 43-47 optionally include, wherein the ECC operation includes an operation comprising at least one of finite field multiplication, finite field addition, or finite field subtraction to be performed by the finite field arithmetic circuit portion.

In Example 49, the subject matter of any one or more of Examples 43-48 optionally include, wherein the finite field arithmetic circuit portion is to perform the ECC operation using two parallel 128-bit carry-chains.

In Example 50, the subject matter of any one or more of Examples 43-49 optionally include, wherein the elliptic curve point addition and double circuit portion includes eight security-length-bit registers.

In Example 51, the subject matter of any one or more of Examples 43-50 optionally include, wherein the point multiplier circuit portion includes iteration count circuitry and d-shift circuitry.

In Example 52, the subject matter of any one or more of Examples 43-51 optionally include, further comprising, means for outputting data from a plurality of ECC operations to generate keys for at least one of a Sign/Verify protocol or a Diffie-Hellman protocol.

In Example 53, the subject matter of Example 52 optionally includes, further comprising means for executing the Sign/Verify protocol or the Diffie-Hellman protocol.

In Example 54, the subject matter of any one or more of Examples 52-53 optionally include, wherein the generated keys include keys for 128-bit or 256-bit security.

In Example 55, the subject matter of any one or more of Examples 43-54 optionally include, wherein the point multiplier circuit portion is resistant to side-channel attacks.

In Example 56, the subject matter of Example 55 optionally includes, further comprising means for using a Montgomery Ladder to resist side-channel attacks on the point multiplier circuit portion.

In Example 57, the subject matter of any one or more of Examples 55-56 optionally include, further comprising means for converting an input from a first coordinate system to a second coordinate system to be resistant to side-channel attacks.

In Example 58, the subject matter of Example 57 optionally includes, wherein the first coordinate system is Affine and the second coordinate system is Randomized Jacobian.

In Example 59, the subject matter of any one or more of Examples 55-58 optionally include, wherein the point multiplier circuit portion is resistant to at least one of simple side-channel attacks or differential side-channel attacks.

In Example 60, the subject matter of any one or more of Examples 43-59 optionally include, wherein the point multiplier circuit portion is not resistant to side-channel attacks.

In Example 61, the subject matter of any one or more of Examples 43-60 optionally include, wherein the finite field exponentiation circuit portion is resistant to side-channel attacks.

In Example 62, the subject matter of Example 61 optionally includes, further comprising means for using a Montgomery Ladder to resist side-channel attacks on the finite field exponentiation circuit portion.

Example 63 is at least one machine-readable medium including instructions for operation of a computing system, which when executed by a machine, cause the machine to perform operations comprising: receiving an elliptic curve (EC) cryptography (ECC) operation request; instructing one of a plurality of circuit portions to perform the ECC operation, the plurality of circuit portions including a finite field arithmetic circuit portion, an EC point addition and doubler circuit portion, a finite field exponentiation circuit portion, and a point multiplier circuit portion, wherein the point multiplier circuit portion is operably coupled to the finite field arithmetic circuit portion, the EC point addition and doubler circuit portion, and the finite field exponentiation circuit portion; and outputting data from the ECC operation.

In Example 64, the subject matter of Example 63 optionally includes, wherein the EC point addition and doubler circuit portion is operably coupled to the finite field arithmetic circuit portion.

In Example 65, the subject matter of any one or more of Examples 63-64 optionally include, wherein the finite field exponentiation circuit portion is operably coupled to the finite field arithmetic circuit portion.

In Example 66, the subject matter of any one or more of Examples 63-65 optionally include, wherein outputting data from the ECC operation includes writing data from the ECC operation to a top level register.

In Example 67, the subject matter of any one or more of Examples 63-66 optionally include, wherein the fi finite field exponentiation circuit portion includes iteration count circuitry and e-shift circuitry.

In Example 68, the subject matter of any one or more of Examples 63-67 optionally include, wherein the ECC operation includes an operation comprising at least one of finite field multiplication, finite field addition, or finite field subtraction to be performed by the finite field arithmetic circuit portion.

In Example 69, the subject matter of any one or more of Examples 63-68 optionally include, wherein the finite field arithmetic circuit portion is to perform the ECC operation using two parallel 128-bit carry-chains.

In Example 70, the subject matter of any one or more of Examples 63-69 optionally include, wherein the elliptic curve point addition and double circuit portion includes eight security-length-bit registers.

In Example 71, the subject matter of any one or more of Examples 63-70 optionally include, wherein the point multiplier circuit portion includes iteration count circuitry and d-shift circuitry.

In Example 72, the subject matter of any one or more of Examples 63-71 optionally include, further comprising, outputting data from a plurality of ECC operations to generate keys for at least one of a Sign/Verify protocol or a Diffie-Hellman protocol.

In Example 73, the subject matter of Example 72 optionally includes, further comprising executing the Sign/Verify protocol or the Diffie-Hellman protocol.

In Example 74, the subject matter of any one or more of Examples 72-73 optionally include, wherein the generated keys include keys for 128-bit or 256-bit security.

In Example 75, the subject matter of any one or more of Examples 63-74 optionally include, wherein the point multiplier circuit portion is resistant to side-channel attacks.

In Example 76, the subject matter of Example 75 optionally includes, wherein the point multiplier circuit portion uses a Montgomery Ladder to be resistant to side-channel attacks.

In Example 77, the subject matter of any one or more of Examples 75-76 optionally include, further comprising converting an input from a first coordinate system to a second coordinate system to be resistant to side-channel attacks.

In Example 78, the subject matter of Example 77 optionally includes, wherein the first coordinate system is Affine and the second coordinate system is Randomized Jacobian.

In Example 79, the subject matter of any one or more of Examples 75-78 optionally include, wherein the point multiplier circuit portion is resistant to at least one of simple side-channel attacks or differential side-channel attacks.

In Example 80, the subject matter of any one or more of Examples 63-79 optionally include, wherein the point multiplier circuit portion is not resistant to side-channel attacks.

In Example 81, the subject matter of any one or more of Examples 63-80 optionally include, wherein the finite field exponentiation circuit portion is resistant to side-channel attacks.

In Example 82, the subject matter of Example 81 optionally includes, further comprising using a Montgomery Ladder to resist side-channel attacks on the finite field exponentiation circuit portion.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. An integrated circuit for elliptic curve cryptography (ECC) operations, the integrated circuit comprising:
   input pins including an instruction pin and a data input pin, input pins controlled by software performing ECC operations;
   output pins including a data output pin and a done pin, the data output pin to provide electrical signals indicating a result of performing an instruction provided on the instruction pin and based on data provided on the data input pin, the done pin to provide electrical signals indicating whether the instruction provided on the instruction pin is complete;
   a plurality of separate circuit portions including:
   a finite field arithmetic circuit portion to compute finite field arithmetic operations;
   an elliptic curve (EC) point addition and doubler circuit portion to perform EC addition and doubling;
   a finite field exponentiation circuit portion to perform finite field exponential operations;
   a point multiplier circuit portion to perform point multiplication, the point multiplier circuit portion operably coupled to the finite field arithmetic circuit portion, the EC point addition and doubler circuit portion, and the finite field exponentiation circuit portion, wherein the point multiplier circuit portion converts an input from an Affine coordinate system to a Randomized Jacobian coordinate system to be resistant to side-channel attacks; and
   execution control circuitry to:
   receive the instruction from the instruction pin;
   write an operand from the data input pin to a register;
   instruct one of the plurality of circuit portions to perform the instruction indicated on the instruction pin based on the operand; and
   output data from performing the instruction on the data output pin and toggle a signal on the done pin to indicate that the data on the data output pin is valid.

2. The integrated circuit of claim 1, wherein the EC point addition and do circuit portion is operably coupled to the finite field arithmetic circuit portion.

3. The integrated circuit of claim 1, wherein the finite field exponentiation circuit portion is operably coupled to the finite field arithmetic circuit portion.

4. The integrated circuit of claim 1, wherein the execution control circuitry is to write the output data from the ECC operation to a top level register.

5. The integrated circuit of claim 1, wherein the finite field arithmetic circuit portion includes iteration count circuitry and e-shift circuitry.

6. The integrated circuit of claim 1, wherein the finite field arithmetic circuit portion is to perform an operation comprising at least one or finite field multiplication, finite field addition, or finite field subtraction.

7. The integrated circuit of claim 1, wherein the finite field arithmetic circuit portion is to perform the ECC operation using two parallel 128-bit carry-chains.

8. The integrated circuit of claim 1, wherein the elliptic curve point addition and double circuit portion includes eight security-length-bit registers.

9. The integrated circuit of claim 1, wherein the point multiplier circuit portion includes iteration count circuitry and d-shift circuitry.

10. The integrated circuit of claim 1, wherein the execution control circuitry is to output data from a plurality of ECC operations to generate keys for at least one of a Sign/Verify protocol or a Diffie-Hellman protocol.

11. The integrated circuit of claim 10, wherein the execution control circuitry is coupled to a machine including a general purpose processor and memory, the memory including instructions, which when executed by the general purpose processor, cause the machine to execute the Sign/Verify protocol or the Diffie-Hellman protocol.

12. The integrated circuit of claim 10, wherein the generated keys include keys for 128-bit or 256-bit security.

13. The integrated circuit of claim 1, wherein the point multiplier circuit portion is resistant to side-channel attacks.

14. The integrated circuit of claim 13, wherein the point multiplier circuit portion uses a Montgomery Ladder to be resistant to side-channel attacks.

15. The integrated circuit of claim 13, wherein the point multiplier circuit portion is resistant to at least one of simple side-channel attacks or differential side-channel attacks.

16. The integrated circuit of claim 1, wherein the point multiplier circuit portion is not resistant to side-channel attacks.

17. The integrated circuit of claim 1, wherein the finite field exponentiation circuit portion is resistant to side-channel attacks.

18. The integrated circuit of claim 17, wherein the finite field exponentiation circuit portion uses a Montgomery Ladder to be resistant to side-channel attacks.

19. A method for using an integrated circuit (IC) to compute elliptic curve cryptography (ECC) operations, the method comprising:
  receiving, at an instruction pin of the IC, an ECC operation request;
  writing an operand from a data input pin of the IC to a register;
  instructing, by execution control circuitry of the IC, one of a plurality of separate circuit portions to perform the instruction indicated on the instruction pin and based on the operand, the plurality of circuit portions including a finite field arithmetic circuit portion, an EC point addition and doubler circuit portion, a finite field exponentiation circuit portion, and a point multiplier circuit portion, wherein the point multiplier circuit portion is operably coupled to the finite field arithmetic circuit portion, the EC point addition and doubler circuit portion, and the finite field exponentiation circuit portion, wherein the point multiplier circuit portion converts an input from an Affine coordinate system to a Randomized Jacobian coordinate system to be resistant to side-channel attacks; and
  outputting data from performing the instruction on a data output pin of the IC and toggle a signal on a done pin of the IC to indicate that the data on the data output pin is valid.

20. The method of claim 19, wherein the EC point addition and doubler circuit portion is operably coupled to the finite field arithmetic circuit portion.

21. The method of claim 19, wherein the finite field exponentiation circuit portion is operably coupled to the finite field arithmetic circuit portion.

22. The method of claim 19, wherein outputting data from the ECC operation includes writing data from the ECC operation to a top level register.

23. The method of claim 19, wherein the finite field arithmetic circuit portion includes iteration count circuitry and e-shift circuitry.

* * * * *

UNITED STATES PATENT AND TRADEMARK OFFICE
CERTIFICATE OF CORRECTION

PATENT NO. : 9,967,098 B2
APPLICATION NO. : 14/757658
DATED : May 8, 2018
INVENTOR(S) : Ghosh et al.

Page 1 of 1

It is certified that error appears in the above-identified patent and that said Letters Patent is hereby corrected as shown below:

In the Claims

In Column 16, Line 9, in Claim 1, before "input", insert --the--

In Column 16, Line 44, in Claim 2, delete "do" and insert --doubler-- therefor

Signed and Sealed this
Seventh Day of April, 2020

Andrei Iancu
*Director of the United States Patent and Trademark Office*